(12) United States Patent
Noerpel et al.

(10) Patent No.: US 9,401,759 B2
(45) Date of Patent: Jul. 26, 2016

(54) MULTIBEAM COVERAGE FOR A HIGH ALTITUDE PLATFORM

(71) Applicant: Hughes Network Systems, LLC, Germantown, MD (US)

(72) Inventors: Anthony Robert Noerpel, Lovettsville, VA (US); Stanley Edward Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 16 days.

(21) Appl. No.: 14/510,790

(22) Filed: Oct. 9, 2014

(65) Prior Publication Data

US 2016/0105806 A1    Apr. 14, 2016

(51) Int. Cl.
H04B 7/185 (2006.01)

(52) U.S. Cl.
CPC .............. *H04B 7/1851* (2013.01); *H04B 7/185* (2013.01); *H04B 7/18513* (2013.01)

(58) Field of Classification Search
CPC ........................................ H04B 7/185–7/2123
USPC ................................................ 455/12.1–13.2
See application file for complete search history.

(56) References Cited

U.S. PATENT DOCUMENTS

| | | | |
|---|---|---|---|
| 5,625,868 A | 4/1997 | Jan et al. | |
| 6,216,244 B1 | 4/2001 | Myers et al. | |
| 2004/0263390 A1 | 12/2004 | Merenda et al. | |
| 2006/0045038 A1 | 3/2006 | Kay et al. | |
| 2011/0007686 A1 | 1/2011 | Burr | |
| 2014/0104107 A1 | 4/2014 | Mangenot et al. | |
| 2015/0009891 A1* | 1/2015 | Miller ................ | H04B 7/18519 370/316 |

FOREIGN PATENT DOCUMENTS

| | | |
|---|---|---|
| WO | 2009088111 | 7/2009 |
| WO | 2014/001837 | 1/2014 |

OTHER PUBLICATIONS

Angeletti et al., "Smart Gateways Concepts for High-Capacity Multi-beam Networks", American Institute of Aeronautics and Astronautics (18 pages).

De Sanctis et al., "Feasibility Study of an Aeronautical-Satellite Broadband Communications Experiment", IEEE, 2008 (5 pages).

(Continued)

*Primary Examiner* — Raymond Dean
(74) *Attorney, Agent, or Firm* — K&L Gates LLP

(57) ABSTRACT

Multibeam coverage for a high altitude platform is disclosed. An example apparatus includes a plurality of antennas configured to provide communication coverage among a plurality of terminals within a specified area on the ground, each antenna being configured to communicate with a specified cell within the specified area. The antennas of the example apparatus have differently sized apertures to maintain a similar surface spectral density among the cells within the specified area.

23 Claims, 17 Drawing Sheets

(56) References Cited

OTHER PUBLICATIONS

Evans et al., Prospects for Commercial Satellite Services at Q- and V-Bands, IEEE, 1998 (7 pages).

Gharanjik et al., "Larger Scale Transmit Diversity in Q/V Band Feeder Link with Multiple Gateways", IEEE, 2013 (5 pages).

Gharanjik et al., "Gateway Switching in Q/V Band Satellite Feeder Links", IEEE Communications Letters, vol. 17, No. 7, Jul. 2013 (4 pages).

Ho et al., "Q/V Band Satellite Feeder Links" (11 pages).

Kyrgiazos et al., "Gateway Diversity scheme for a Future Broadband Satellite System", 6th Advanced Satellite Multimedia Systems Conference, 2012 (8 pages).

Kyrgiazos et al., "On the Gateway Diversity for High Throughput Broadband Satellite Systems", IEEE Transactions on Wireless Communications, Oct. 2014, vol. 13, No. 10 (16 pages).

Thompson et al., "Concepts and Technologies for a Terabit/s Satellite", The Third International Conference on Advances in Satellite and Space Communications, 2011 (8 pages).

International Search Report—PCT/US2015/054918—dated Feb. 10, 2016, 5 pages.

Written Opinion—PCT/US2015/054918—dated Feb. 10, 2016, 11 pages.

Chang et al., "Basic capacity calculation methods and benchmarking for MF-TDMA and MF-CDMA communication satellites", International Journal of Satellite Communications and Networking Int. J. Satell. Commun. Network, 2005; 23:153-171.

* cited by examiner

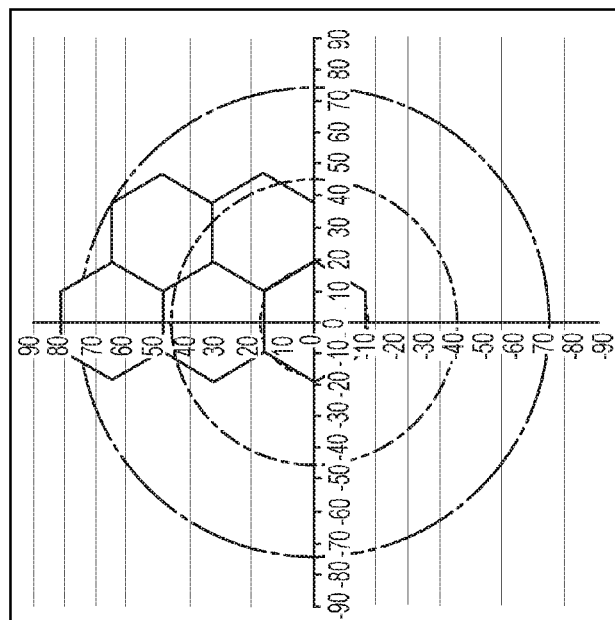
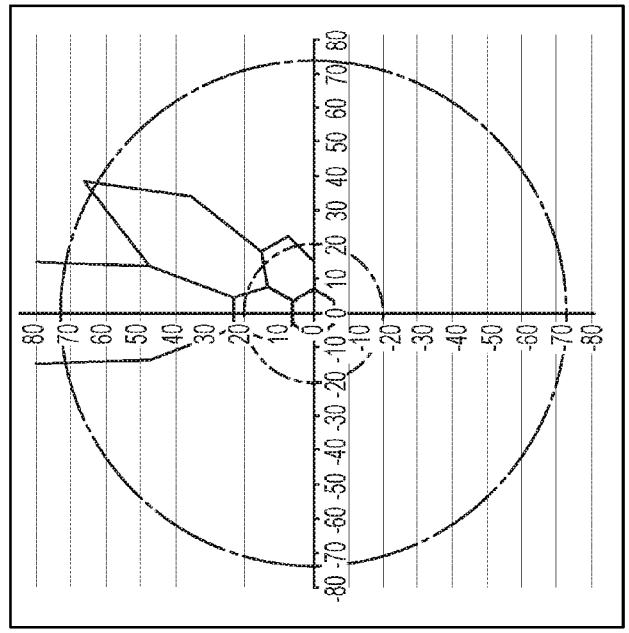
FIG. 1
PRIOR ART

| α (DEGREES) | 90 - UT ELEV (DEGREES) | RANGE (km) | SURFACE AREA (km²) | # OF BEAMS | PER BEAM AREA (km²) | DELAY (Msec) | RADIUS (km) | RADIUS OF COVERAGE (km) |
|---|---|---|---|---|---|---|---|---|
| 74.3 | 15.0 | 75.7 | 15403.4 | 12 | 1283.6 | 0.25 | 20.2 | 72.9 |
| 45.1 | 45.7 | 28.4 | 1153.4 | 6 | 192.2 | 0.09 | 7.8 | 20.1 |
| 17.1 | 82.9 | 20.9 | 118.3 | 1 | 118.3 | 0.07 | 6.1 | 6.1 |

FIG. 6
PRIOR ART

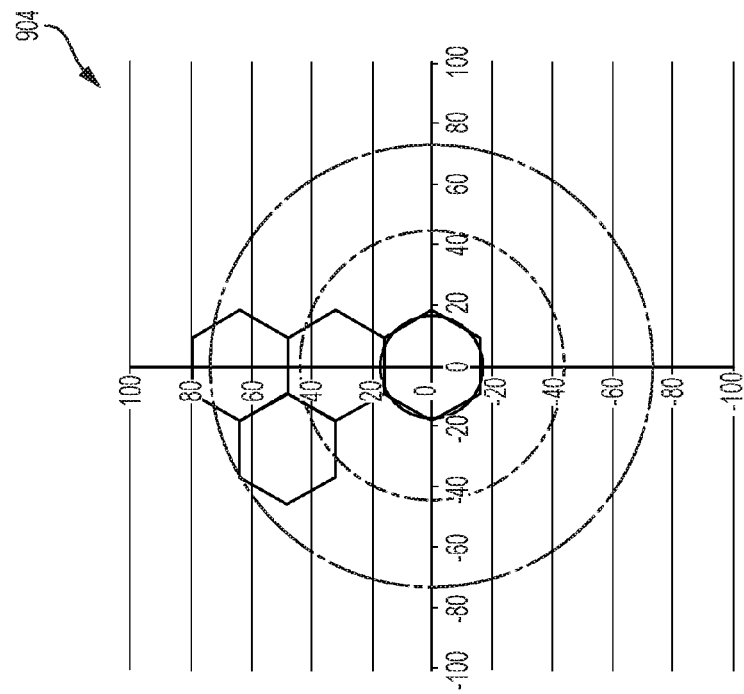
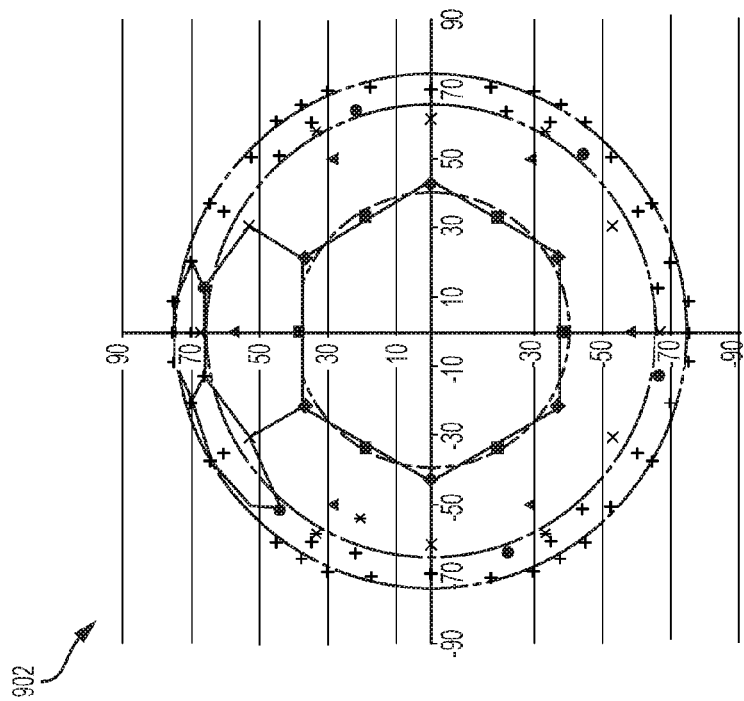
FIG. 9

| α (DEGREES) | 90 - UT ELEV (DEGREES) | RANGE (km) | SURFACE AREA (km2) | # OF BEAMS | PER BEAM AREA (km2) | DELAY (Msec) | RADIUS (km) | RADIUS OF COVERAGE (km) | BEAMWIDTH (DEGREES) |
|---|---|---|---|---|---|---|---|---|---|
| 74.3 | 15.0 | 75.7 | 15403.4 | 12 | 1283.6 | 0.25 | 20.2 | 72.9 | 8.9 BY 28 |
| 45.1 | 45.7 | 28.4 | 1153.4 | 6 | 192.2 | 0.09 | 7.8 | 20.1 | 25.6 BY 52 |
| 17.1 | 82.9 | 20.9 | 118.3 | 1 | 118.3 | 0.07 | 6.1 | 6.1 | 79.7 |

| INPUT DESIGN PARAMETER | VALUE |
|---|---|
| FREQUENCY (GHz) | 30 |
| HEIGHT OF HAP (km) | 20 |
| RADIUS OF EARTH (km) | 6371 |
| TOTAL # CELLS | 19 |
| CELLS IN OUTER RING | 12 |
| SPECTRUM ALLOCATION | 300 |
| POLARIZATION REUSE | 2 |
| SPECTRAL REUSE | 4 |
| AVAILABLE SPECTRUM PER CELL | 150 |
| MINIMUM ELEVATION ANGLE (DEGREES) | 15 |
| USER TERMINAL PARAMETERS | |
| RECEIVER NOISE FIGURE (dB-K) | 5 |
| RECEIVER NOISE TEMPERATURE (K) | 627. |
| ELEVATION BEAM WIDTH (DEGREES) | 1 |
| AZUMITH BEAMWIDTH (DEGREES) | 1 |
| ANTENNA HEIGHT (m) | 0.7 |
| ANTENNA WIDTH (m) | 0.7 |
| GAIN (dB) | 45 |
| PROPAGATION PARAMETERS | |
| GAS LOSSES (dB) | 0.89 |
| CLOUD ATTENUATION 99.5% (dB) | 0.58 |
| RAIN ATTENUATION 99.5% (dB) | 14.43 |
| SCINTILLATION 99.5% (dB) | 0.65 |
| TOTAL ATTENUATION (dB) | 15.91 |
| SPECTRAL ROLLOFF | 10% |
| OVERHEAD | 12.5% |

FIG. 12

| MODCOD | Eb/NO | MOD INDEX | CODE RATE | MODCOD | Eb/NO | MOD INDEX | CODE RATE | MODCOD | Eb/NO | MOD INDEX | CODE RATE |
|---|---|---|---|---|---|---|---|---|---|---|---|
| BPSK 1/5 R2 | -9.78 | 2 | 0.1 | QPSK 8/9 | 7 | 4 | 0.88889 | 16APSK 31/36 | 14.19 | 16 | 0.86111 |
| BPSK 1/4 R2 | -8.59 | 2 | 0.125 | QPSK 9/10 | 7.24 | 4 | 0.9 | 32APSK 13/18 | 14.79 | 32 | 0.72222 |
| BPSK 1/5 | -6.77 | 2 | 0.2 | 8PSK 2/3 | 7.39 | 8 | 0.66667 | 16APSK 8/9 | 15.14 | 16 | 0.88889 |
| BPSK 1/4 | -5.58 | 2 | 0.25 | 8PSK 25/36 | 7.93 | 8 | 0.69444 | 16APSK 9/10 | 15.45 | 16 | 0.9 |
| BPSK 1/3 | -4.29 | 2 | 0.33333 | 8PSK 13/18 | 8.42 | 8 | 0.72222 | 32APSK 3/4 | 15.56 | 32 | 0.75 |
| QPSK 2/9 | -2.76 | 4 | 0.22222 | 8PSK 3/4 | 8.83 | 8 | 0.75 | 32APSK 7/9 | 15.89 | 32 | 0.77778 |
| QPSK 1/4 | -2.03 | 4 | 0.25 | 16APSK 26/45 | 9.18 | 16 | 0.57778 | 32APSK 4/5 | 16.54 | 32 | 0.8 |
| QPSK 13/45 | -1.6 | 4 | 0.28889 | 16APSK 3/5 | 9.38 | 16 | 0.6 | 32APSK 5/6 | 17.27 | 32 | 0.83333 |
| QPSK 1/3 | -0.78 | 4 | 0.33333 | 16APSK 28/45 | 9.75 | 16 | 0.62222 | 64APSK 13/18 | 18.03 | 64 | 0.72222 |
| QPSK 2/5 | 0.06 | 4 | 0.4 | 16PSK 23/36 | 10.04 | 16 | 0.63889 | 64APSK 3/4 | 18.42 | 64 | 0.75 |
| QPSK 9/20 | 0.69 | 4 | 0.45 | 8PSK 5/6 | 10.4 | 8 | 0.83333 | 32APSK 8/9 | 18.98 | 32 | 0.88889 |
| QPSK 1/2 | 1.47 | 4 | 0.5 | 16PSK 2/3 | 10.68 | 16 | 0.66667 | 64APSK 7/9 | 19.09 | 64 | 0.77778 |
| QPSK 11/20 | 1.97 | 4 | 0.55 | 16APSK 25/36 | 11.04 | 16 | 0.69444 | 32APSK 9/10 | 19.37 | 32 | 0.9 |
| QPSK 3/5 | 2.72 | 4 | 0.6 | 16APSK 13/18 | 11.52 | 16 | 0.72222 | 64APSK 4/5 | 19.54 | 64 | 0.8 |
| QPSK 2/3 | 3.67 | 4 | 0.66667 | 8PSK 8/9 | 11.95 | 8 | 0.88889 | 64APSK 5/6 | 20.44 | 64 | 0.83333 |
| QPSK 3/4 | 4.68 | 4 | 0.75 | 16APSK 3/4 | 12.07 | 16 | 0.75 | 64APSK 31/36 | 21.08 | 64 | 0.86111 |
| QPSK 4/5 | 5.36 | 4 | 0.8 | 8PSK 9/10 | 12.24 | 8 | 0.9 | 256APSK 2/3 | 22 | 256 | 0.66667 |
| QPSK 5/6 | 5.88 | 4 | 0.83333 | 16APSK 7/9 | 12.52 | 16 | 0.77778 | 256APSK 25/36 | 22.96 | 256 | 0.69444 |
| 8PSK 3/5 | 6.25 | 8 | 0.6 | 16APSK 4/5 | 12.98 | 16 | 0.8 | 256APSK 13/18 | 23.72 | 256 | 0.72222 |
| 8PSK 23/36 | 6.96 | 8 | 0.63889 | 16APSK 5/6 | 13.64 | 16 | 0.83333 | | | | |

FIG. 14

| CELLS | 702c | 702b | 702a |
|---|---|---|---|
| NUMBER | 12 | 6 | 1 |
| ELEVATION ANGLE OUTER EDGE (DEGREES) | 15 | 24.10 | 50.00 |
| ALPHA OUTER EDGE (DEGREES) | 74.34 | 65.50 | 39.85 |
| RANGE OUTER EDGE (km) | 75.66 | 48.60 | 26.08 |
| COVERAGE RADIUS OUTER EDGE (km) | 72.85 | 44.22 | 16.71 |
| AREA OF CELL (km^2) | 877.62 | 877.62 | 877.62 |
| AREA OF RING (km^2) | 10531.48 | 5265.74 | 877.62 |
| HAP ANTENNA DIMENSIONS | | | |
| ELEVATION BEAM WIDTH (DEGREES) | 8.85 | 25.64 | 79.71 |
| AZUMITH BEAMWIDTH (DEGREES) | 30.00 | 60.00 | 79.71 |
| ANTENNA HEIGHT (m) | 0.08 | 0.03 | 0.01 |
| ANTENNA WIDTH (m) | 0.02 | 0.01 | 0.01 |
| GAIN (dB) | 20.74 | 13.11 | 6.95 |
| PATTERN LOSS AT EDGE (dB) | 3.00 | 3.00 | 3.00 |
| EIRP AT EDGE (dBW) | 17.74 | 10.11 | 3.95 |
| PATH LOSS | 159.57 | 155.72 | 150.32 |
| BANDWIDTH PER CELL (MHz) | 150.00 | 150.00 | 150.00 |
| SYMBOL RATE | 136.36 | 136.36 | 136.36 |
| | | | |
| POWER PER BEAM (dBW) | -4.55 | -4.54 | -5.00 |
| Es/No AT EDGE OF CELL (AVAIL) | 1.47 | 1.47 | 3.26 |
| DVB-S2 MODULATION AND CODE RATE AT CELL EDGE | QPSK 1/2 | QPSK 1/2 | QPSK 3/5 |
| ES/No (REQUIRED) | 1.47 | 1.47 | 2.72 |
| MARGIN | 0.00 | 0.00 | 0.54 |
| RAW CARRIER BIT RATE | 136.36 | 136.36 | 163.64 |
| OVERHEAD | 0.13 | 0.13 | 0.13 |
| END USER BIT RATE AT EDGE OF COVERAGE (Mbps) | 121.21 | 121.21 | 145.45 |
| TOTAL POWER PER RING (WATTS) | 4.21 | 2.11 | 0.32 |
| TOTAL POWER dBW | 8.22 | | |
| AVERAGE DENSITY WITHIN THE RING (kb/km^2) | 253.21 | 275.21 | 257.24 |

FIG. 15

| # BEAMS | 18 | 7 CENTER |
|---|---|---|
| COVERAGE PER BEAM (sq km) | 878 | 125 |
| CELL RADIUS (km) | 16.7 | 6.3 |
| SPECTRUM/BEAM (MHz) | 300 | 43 |

| α (DEGREES) | 90 - UT ELEV (DEGREES) | RANGE (km) | SURFACE AREA (km2) | # OF BEAMS | PER BEAM AREA (km2) | DELAY (msec) | RADIUS (km) |
|---|---|---|---|---|---|---|---|
| 74.3 | 15 | 75.7 | 8112 | 18 | 451 | 0.25 | 12 |
| 68.8 | 20.7 | 56 | 5408 | 12 | 451 | 0.11 | 12 |
| 57.6 | 32.1 | 37.5 | 2704 | 6 | 451 | 0.08 | 12 |
| 30.9 | 59 | 23.3 | 451 | 1 | 451 | 0.07 | 12 |

MULTIBEAM COVERAGE FOR A HIGH ALTITUDE PLATFORM

BACKGROUND

Satellites provide communication coverage over a specified surface area on Earth. As discussed herein, a cell is a geographical coverage area on the surface of the Earth and a spot beam is a radiation pattern of an antenna that illuminates a cell. A surface spectral density (Hertz per square kilometer ("Hz/km$^2$")) within the coverage area is typically increased by increasing the number of radiated spot beams to partition the coverage area into multiple cells and reusing the available spectrum many times. For instance, dividing an area previously covered by one broad beam into 19 cells covered by 19 narrow spot beams and splitting the frequency spectrum into four equal parts (and reusing the spectrum in smaller cells) results in a surface spectral density that is increased by a factor of 19/4 or nearly five-times. To provide broad and uniform coverage with a high surface spectral density, the satellite or telecommunications platform accordingly may use a plurality of antennas such that each antenna is configured to provide similar communication coverage (e.g., a spot beam) to a cell. It is also common practice to create multiple beams from a single antenna by using more than one duplex feed for each antenna. Phased array and beamforming techniques are also well-known.

Generally, antennas with identical dimensions and properties are chosen to reduce design variation. However, the variation of distances between a platform and various cells, resulting in part from the curvature of the Earth, leads to differently sized cells from identical antennas. For instance, cells directly below a platform are relatively smaller compared to cells at the edges of a specified coverage area. If the same amount of spectrum is used in each cell then the surface spectral density is greater for the smaller cells below the platform compared to the surface spectral density of the larger cells at the outer edges of coverage. Differences in surface spectral density between cells can result in service disruptions and/or service degradations or a difference in the perceived quality of service as a user moves between cells or as the cells move past the users.

In geostationary Earth Orbit ("GEO") satellite systems, the effects of cell size differences are generally not severe or noticeable. For instance, at the geostationary orbit height of 35,786 km above the surface, Earth subtends an angle of only 20°. This means that except at the extreme edges of satellite coverage where the surface curves away from the satellite, cells within a coverage area are generally uniform. However, for satellites at lower altitudes, the differences between cell sizes are more pronounced. For instance, Earth subtends an angle of about 160° relative to a high altitude platform operating between 17 km and 22 km above the surface. This greater angle causes significant differences in cell areas covered by the same antennas. Such differences in cell size can affect the quality of service ("QoS") because coverage in the cells located on the perimeter of the coverage area is subject to higher path loss and lower surface spectral density, thereby resulting in lower user bandwidth.

GEO satellites are stationary relative to a point on Earth but satellites in other orbits move relative to fixed points on Earth. For the latter systems, therefore even stationary user terminals will be served by different spot beams over time, i.e., the cells move with the telecommunications platform. If different cells use the same amount of frequency spectrum but have different sizes, the available bandwidth for each user terminal changes, which may cause service disruptions.

SUMMARY

The present disclosure provides a new and innovative system, method, and apparatus for providing multi-beam coverage to connect user terminals to the Internet via gateway stations using a telecommunications platform such as a high altitude platform ("HAP") or a Low Earth Orbit ("LEO") satellite platform. The example system, method, and apparatus disclosed herein use differently dimensioned antennas (e.g., antennas with differently sized apertures) to create substantially equal-sized cells (and/or cells with the same surface spectral density) within a specified user terminal coverage area. Communications links with the one or more gateway stations are provided by one or more stationary spot beams from a mechanically or electronically pointed antenna. The differently dimensioned/configured antennas provide corresponding different spot beams that compensate for the distance and subtended angle of each cell. This configuration of using differently dimensioned antennas produces a surface spectral density that is generally constant throughout a coverage area of the platform, which provides substantially uniform communication coverage among the different cells and a consistent perceived quality of service. Different sized antenna apertures may also be achieved with a single antenna with multiple feeds or a suitably designed phased array antenna.

In an example embodiment, a telecommunications platform or transceiver apparatus includes a plurality of antennas configured to provide communication links between a gateway station and a plurality of user terminals within a specified coverage area on the ground, each user link antenna being configured to communicate with a specified cell within the specified coverage area and each gateway link antenna being configured to communicate with a specific gateway. A system configuration management apparatus includes logical links to platforms, gateways and user terminals to receive status and other management information and to download configuration and provisioning parameters. The system configuration manager also includes system design planning and updating functions. As discussed herein, planning includes the design of cell numbers and sizes and an assigned frequency plan. Based on the cell sizes, the system configuration manager may design differently sized aperture antennas for the telecommunications platform (satellite or HAPS) apparatus to maintain a similar surface spectral density among the cells within the specified area to meet specified design criteria.

In another example embodiment, a method to provision a telecommunications apparatus includes determining an altitude at which the telecommunications apparatus will operate and determining a minimum elevation angle from the ground to the telecommunications apparatus. The method also includes determining a coverage area of the telecommunications apparatus based on the altitude and the minimum elevation angle, partitioning the coverage area into substantially equal-sized cells, and assigning an antenna to each of the cells. The method further includes determining a beamwidth and an elevation angle for each antenna to provide communication coverage to the corresponding cell, and determining an aperture for each of the antennas based on the beamwidth and the elevation angle. This method may also include determining an optimal design for a platform that does not maintain a constant altitude, which causes the cell sizes on the ground to vary.

Additional features and advantages of the disclosed system, method, and apparatus are described in, and will be apparent from, the following Detailed Description and the Figures.

BRIEF DESCRIPTION OF THE FIGURES

FIG. 1 shows a diagram of prior art equal-sized HAP antenna apertures and consequent coverage area on the surface of the Earth.

FIG. 6 shows a table of properties of the coverage area of FIG. 4.

FIG. 9 shows the uniform cells of FIG. 7 as they project back onto a spherical u-v surface around the platform of FIG. 2 and as they appear on the surface of the Earth, according to an example embodiment of the present disclosure.

FIG. 12 shows a diagram of parametric inputs to a design process implemented by the system configuration manager of FIG. 2, according to an example embodiment of the present disclosure.

FIG. 14 shows a diagram of modulation and coding schemes used in the DVB-S2 standard, according to an example embodiment of the present disclosure.

FIG. 15 shows a diagram of exemplary results of the example described in conjunction with FIGS. 12 to 14, according to an example embodiment of the present disclosure.

DETAILED DESCRIPTION

Figure 2:
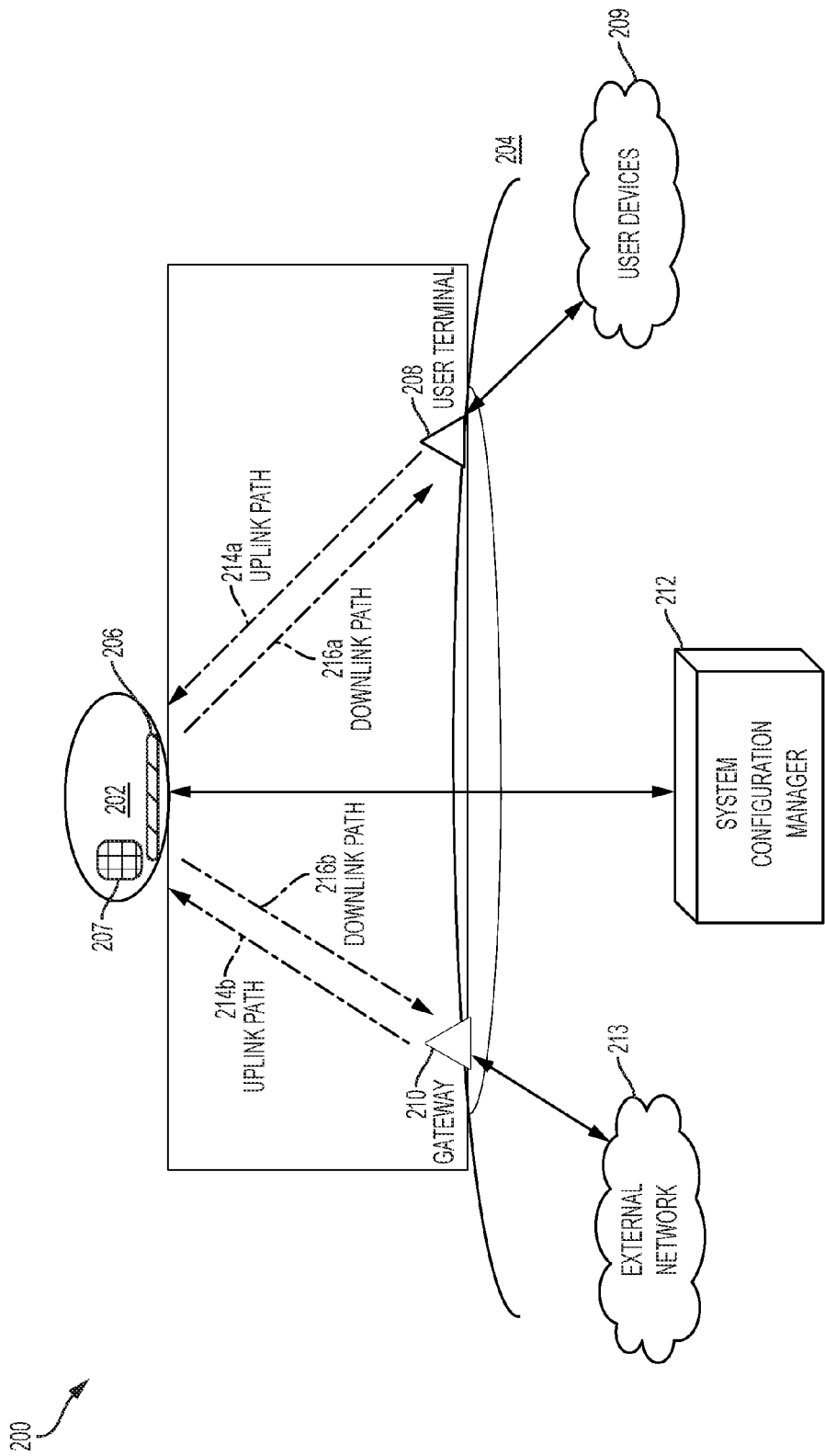
FIG. 2 shows a diagram of an example telecommunications communication system, according to an example embodiment of the present disclosure.

The present disclosure relates in general to a method, apparatus, and system to provide multi-beam coverage by a telecommunications platform. As disclosed herein, the term 'platform' may refer to any Low Earth Orbit ("LEO") satellite, Medium Earth Orbit ("MEO") satellite, Geosynchronous Earth Orbit ("GEO") satellite, and/or High Altitude Platform ("HAP"). A HAP may include any airship, airplane, balloon, etc. operating between, for example, 17 km and 22 km over the surface.

The example method, apparatus, and system disclosed herein use antennas with differently sized apertures to provide substantially consistent coverage among cells of a specified area. For instance, antennas may be configured to have different apertures so as to cover cells of relatively the same area and/or cells with substantially the same surface spectral density. The techniques described herein achieve uniform coverage using individual antennas per spot beam. However, the techniques are also extensible to phased arrays and/or multiple single feed per beam arrays. As discussed herein, antenna aperture is an effective area (orientated perpendicular to a direction of an incoming (or outgoing) radio wave) representative of how effective an antenna is at receiving (or transmitting) radio waves. Typically the effective area of an antenna is 55% of the actual physical area of the antenna aperture.

HAPs using antennas configured to support communications with the same sized aperture have been envisioned since the 1970s. However, technology to support high-speed and reliable wireless communication has not become available until recently. Additionally, technology to maintain HAPs within the air for extended periods of time has only recently become available. For instance, the energy density, weight, and size of batteries, fuel cells, and solar cells have become advanced enough to support continuous operation of an airship or blimp in the sky for 30 to 60 days or more.

HAPs have several potential advantages compared to higher altitude satellites. For instance, HAPs generally have a relatively low communication latency in the 100's of microseconds ("μsec") compared to latencies of 100's milliseconds ("msec") for GEO satellites and 10's msec for LEO satellites operating over 500 km. Additionally, HAPs have a shorter product development cycle time compared to satellites, which require space qualification in addition to engineering design that ensures continuous operation for an extended period of time (e.g., ten years). Also, launching a few GEO satellites or a large constellation of LEO satellites can be very expensive and high risk. This means that HAPs may be developed with less upfront capital investment than satellites. HAPs may also be repaired and/or upgraded relatively easily by landing the HAPs for service. In comparison, satellites cannot generally be repaired or upgraded once launched into space.

Further, HAPs may be provisioned one at a time so that a HAP-based communication system can be rolled out to different geographic areas at different times without affecting performance of other HAPs within the system. In contrast to HAPs, satellites are expensive and generally take several years to design, build, qualify, and launch before service can begin. LEO satellite systems also generally require that all satellites be provisioned at the same time to provide system wide coverage.

Another disadvantage of satellites is that there is generally too much capacity provided in low usage areas. Satellites have coverage areas that are relatively large where a sizable portion of the coverage area includes oceans, lakes, deserts, forests, and protected lands that have few (if any) users. Additionally, some LEO satellites spend a significant amount of time orbiting over oceans and other uninhabited areas. Since a sizeable portion of the coverage area (and consequently bandwidth) is provided to sparsely populated areas, satellites have trouble providing enough capacity in relatively small high usage areas where the amount of bandwidth for that area is limited. In contrast, HAPs are deployed where there are large concentrations of users (e.g., cities), thereby providing service where there is the greatest demand/need.

A further disadvantage of satellites is the power and antenna size needed to provide high QoS communications. Satellites are generally thousands of kilometers above the surface, which requires high power output per antenna and larger antenna sizes to maintain acceptable QoS parameters. HAPs in contrast are much closer to the surface (e.g., 17 km to 22 km) and can provide the same (or better) QoS with lower power and smaller antennas.

Some HAPs have been proposed that use satellite communication technology including antennas and transceivers. These HAPs accordingly have antennas (or antenna elements) of the same size to provide spot beams to respective cells of a coverage area. These antennas provide spot beams with the same beam widths. However, the size of each cell under this antenna configuration varies significantly based on the location of the cell relative to the HAP. This cell area difference becomes larger for cells at the perimeter of the coverage area and becomes significantly pronounced for HAPs that operate at less than 30 km from the surface.

For example, a typical HAP that operates 20 km above the surface may have 19 antennas that provide communication coverage to 19 respective cells. In aggregate, the 19 cells define a coverage area of the HAP. In this example, if it is assumed that a surface coverage radius of 75 km, which corresponds to a minimum elevation angle at a user terminal at the edge of coverage of 15 degrees, the use of similar sized antennas results in the cell in the center of the coverage area having a surface area of 118 $km^2$ and the 12 outer cells each having a surface area of 1283 $km^2$. This results in a cell size difference of 1165 $km^2$ between inner and outer cells of the coverage area. In other words, the inner cell is less than 9% the size of the larger outer cells. Assuming the density of users per square km within the coverage area is constant, users in the outer cells would have a factor of 11 less available bandwidth and significantly reduced QoS compared to users in the innermost seven cells. FIG. 1 shows that a projection of equal aperture antenna radiation patterns (shown in chart 104) onto the surface results in some large beams at the intended edge of coverage (shown in chart 102). Some of these beams illuminate an area of nearly 3600 $km^2$ while others fall short of covering the intended area. The extended illumination at the edges of covers potentially causes interference with adjacent HAPs systems and may not be usable because the user terminal elevation angle would be very small and the path loss increases with distance from the HAP. This is not a problem for GEO satellites because the whole Earth subtends an angle of 20°, which is well inside the center HAP beam where the projection is better behaved.

Additionally, free space path loss experienced by the user terminals in the outer cells would be up to 11.6 dB greater than user terminals within the 7 inner cells because path loss is proportional to the square of the distance from the user terminal to the platform. Additionally, rain attenuation and atmospheric gas absorption both increase with the distance the signal propagates through the atmosphere or inversely with the user terminal elevation angle. These phenomena are location dependent as rain and water vapor depend on location of the coverage area on the surface of the Earth, which may vary from desert areas to high rain areas. User terminals that travel from an inner cell to an outer cell would experience a significant QoS degradation.

In instances where the HAP is mobile or the cells provided by the HAP are mobile, the coverage area and cells move as the HAP moves in the sky. A stationary user terminal within an inner cell at one point in time may be within an outer cell at another point in time. This stationary user terminal would be switched from a cell with high available bandwidth (or high QoS) to a cell with low available bandwidth (or low QoS). The user would accordingly perceive or detect a significant drop in performance while remaining in the same geographic location.

Additionally, in instances where the HAP position is substantially held constant by navigating in figure eights/circles, or flying into the wind, the cells may or may not move on the surface. The HAP may contain mechanisms for moving the on-board antennas to compensate for the HAP movement. The advantages of the uniform spectral density cells still apply in this case. This case, however, also allows for creating different spectral density cells if the users are not uniformly distributed over the coverage area.

The example platform (i.e., HAP) system disclosed herein uses differently sized antennas (or antenna elements) to provide substantially uniform QoS or surface spectral density across all cells within a coverage area. The differently sized antennas provide corresponding different size beam widths, which compensates for the angle at which Earth subtends at 17 km to 22 km resulting in substantially similarly sized cells. Such a configuration of differently sized antennas maintains a consistent QoS or available bandwidth throughout the cells of a coverage area so that a user does not experience service degradation when the user terminal moves between cells and/or the HAP moves relative to a user terminal. To maintain consistent cell areas, antennas covering the outer cells are relatively larger (and consequently have more gain) than those antennas coving the interior cells. The increased gain for the antennas covering the outer cells compensates, in part, for the increased path loss from the greater distance to reach those outer cells. Further, the consistent cell sizes means that link margins between user terminals and the HAP are similar, which means that antennas on the user terminals can be the same regardless of the location of the user terminal within the coverage area.

HAP Communication Environment

FIG. 2 shows a diagram of an example satellite communication system 200, according to an example embodiment of the present disclosure. The example satellite communication system 200 includes a platform 202 (e.g., a HAP) configured to operate at a specified altitude above the Earth's surface 204. For instance, the platform 202 may operate between 17 to 22 km above the surface of the Earth. In other examples, the platform 202 may be replaced by any other suitable communications satellite.

The example platform 202 includes antennas 206 in addition to hardware 207 (e.g., receiver, switch, transmitter, modem, router, filter, amplifier, frequency translator computing device, processor, memory/buffer, etc.) to facilitate the relay of communications between user devices 208 and a gateway 210. For example, the platform 202 may have a transponder bent-pipe design for relaying communications signals between the gateway 210 and the user terminals 208 in multiple cells. In some embodiments, the platform 202 may include processing, switching or routing capability so that circuits may be switched or individual packets may be routed between different cells. The communications signals transmitted to/from the platform 202 can be any combination of standard or proprietary waveforms. Additionally, the gateway can be connected to any combination of communications networks such as the Internet.

The example hardware 207 may include a switch and/or processor that is configured to retransmit communications received from one cell back to the same cell or another cell. For instance, a switch may be configured to receive communication data from at least one of the gateway 210 and the user terminals 208 and determine a destination cell within a coverage area for the communication data. The switch then selects one of the plurality of antennas 206 corresponding to the destination cell to transmit the communication data and accordingly transmits the communication data via the selected antenna. In other embodiments the data could be sent to other HAPS, GEO/LEO satellites, or other aircraft.

The example user terminal 208 can be any terminal capable of communicating with the platform 202. The user terminal 208 includes an antenna, transceiver, and processor to facilitate the transmission of data with the platform 202. The user terminals 208 may be connected to any user communications equipment or device such as a router, switch, phone or computer 209. The user terminal 208 may also include a mobile platform.

The example gateway 210 includes any centralized transceiver connected to a network 213 (e.g., the PSTN, Internet, a LAN, a virtual LAN, a private LAN, etc.). The gateway 210 may include one or more base stations, antennas, transmitter, receiver, processor, etc. configured to convert data received from the network 213 into signals for wireless transmission to the platform 202 and convert data received from the platform 202 into signals for transmission to the network 213. In some instances, the platform 202 may be in communication with more than one gateway 210. Additionally or alternatively, the gateway 210 may be in communication with more than one platform 202. In these instances, the gateway 210 may select which platform 202 is to receive the data based on, for example, a destination of the data.

The example user terminals 208 and the gateway 210 are configured to communicate with the platform 202 via uplinks 214 downlinks 216. The links 214 and 216 use spot beams provided by the platform 202 to cover specified cells containing the user terminal 208 and/or the gateway 210. It should be appreciated that a spot beam may multiplex a plurality of signals on each uplink 214 and each downlink 216 based on the amount of user terminals 208 and/or gateways 210 transmitting or receiving data within a cell. Data is transmitted to the platform 202 from the user terminals 208 via the uplink 214a and data is received from the platform 202 at the user terminals 208 via the downlink 216a. Similarly, data is transmitted to the platform 202 from the gateway 210 via the uplink 214b and data is received from the platform 202 at the gateway 210 via the downlink 216b. The gateway 210 sends communication signals to the user terminal 208 via a forward link comprising the uplink 214b and the downlink 216a and the user terminal 208 sends communications signals to the gateway 210 via the return link comprising the uplink 214a and the downlink 216b.

Mesh connectivity between user terminals 208 in the same or difference cells is also possible depending on the capabilities of the communications platform, i.e., the platform 202 or a satellite. While the disclosure is not limited to any frequency, certain frequency spectrums have been allocated for HAP communications by regulatory bodies. These allocated frequencies are used in the example discussed herein. The example embodiment assumes the uplink 214b may use a frequency band between 47.2 and 47.5 GHz, the downlink 216b may use a frequency band between 47.9 and 48.2 GHz, the uplink 214a may use a frequency band between 31.0 and 31.3 GHz and the downlink 216a may use a frequency band between 27.9 and 28.2 GHz.

Another possible embodiment assumes the uplink 214b may use a frequency band between 31.0 and 31.3 GHz and the downlink 216a may use a frequency band between 27.9 and 28.2 GHz and both the uplink 214b and the downlink 214b may use a frequency band between 47.2 and 47.5 GHz and 47.9 and 48.2 GHz. In the United States the allocation includes the entire band between 47.2 and 48.2 GHz. The advantage of the first embodiment is that rain attenuation on the user links is easier to close with higher data rates. The advantage of the second embodiment is that more spectrum is available for the user data links. The disclosure is not restricted to either of these frequency plans and in the future other frequencies may become available to HAP communications. If the methods and apparatus of disclosure are applied to LEO satellites, other spectrum is already available.

As discussed in more detail below, the antennas 206 of the example platform 202 are configured to have different sizes (e.g., different size apertures) to create cells of substantially the same size in order to achieve a constant surface spectral density throughout the coverage area. A system configuration manager 212 includes any processor or system tasked with designing, developing, and/or maintaining the antennas 206, hardware 207, and other features of the platform 202. The system configuration manager 212 may determine a coverage area to be serviced by the platform 202 in addition to a number of antennas needed to provide acceptable bandwidth to user terminals and the size of the antennas to maintain spectral density uniformity among the cells. The system configuration manager 212 may also select the type of antenna including, for example, a reflector, array, open ended waveguide, dipole, monopole, horn, etc. The system configuration manager 212 may select the antenna type based on, for example, a desired spot beam size, bandwidth, gain, elevation angle relative to the surface, etc. The system configuration manager 212 may also select the size of the aperture of the antenna 206 based on the desired spot beam size, bandwidth, gain, elevation angle, etc. In some instances, the system configuration manager 212 may include a control link to configure the platform 202 based on a new set of coverage area and QoS parameters. Depending on the capability of the platform 202, such parameters may include new frequency assignments, new spot beam forming coefficients or new routing tables.

In addition to configuring the platform 202, the example system configuration manager 212 may also service and/or maintain the platform 202. For example, the system configuration manager 212 may transmit software updates while the platform 202 is operational in the sky. The system configuration manager 212 may also instruct the platform 202 to move to a new geographical location. The system configuration manager 212 may further instruct the platform 202 to return to the ground for maintenance, upgrades, service, antenna reconfiguration, etc. The system configuration manager 212 may communicate with the platform 202 via the gateway 210 and/or a proprietary/private communication link. In some instances, the platform 202 may provide diagnostic and status information to the system configuration manager 212 via the proprietary/private communication link and/or through the gateway 210 multiplexed with communications traffic.

HAP Coverage Area Embodiment

Figure 3:
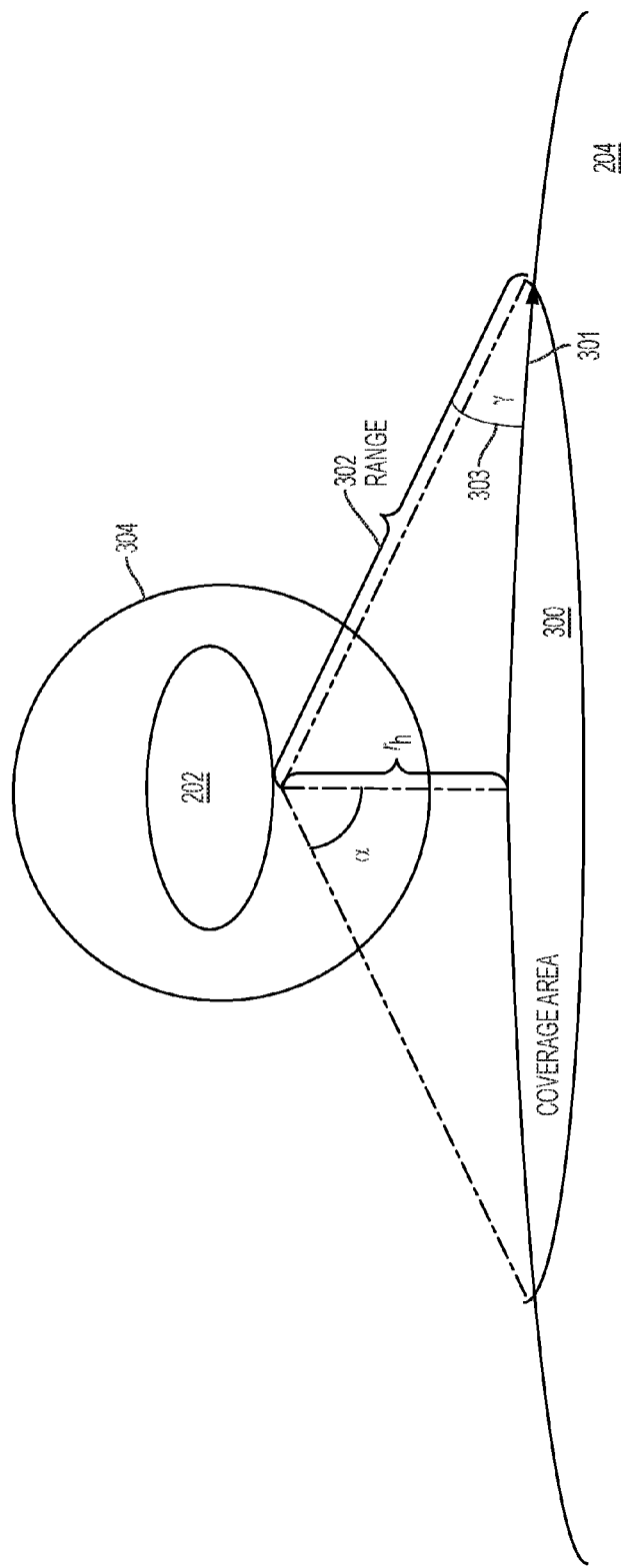
FIG. 3 shows a diagram of an example HAP coverage area for a HAP discussed above in conjunction with FIG. 1, according to an example embodiment of the present disclosure.

FIG. 3 shows a diagram of an example HAP coverage area 300 for the platform 202 discussed above in conjunction with FIG. 2, according to an example embodiment of the present disclosure. In this example, the platform 202 operates at an altitude of $r_h$ above the surface 204. The altitude $r_h$ may be any distance between, for example, 17 km and 22 km. The platform 202 provides communications for the coverage area 300 that falls within a maximum range 302. The range 302 depends, on the altitude $r_h$, a minimum acceptable elevation angle respective to a user device ("γ") 303, and desired link margin. The link margin is dependent on the available platform power, platform antenna gain, terminal antenna gain, link availability requirements, terminal gain, and other equipment and link limitations. For example, the platform 202 operating at 20 km may have a maximum range 302 of 75 km for a minimum elevation angle γ of 15 degrees, 110 km for a minimum elevation angle γ of 10 degrees and 195 km for a minimum elevation angle γ of 5 degrees. Assuming, for example, a maximum range 302 of 110 km and a minimum elevation angle γ of 10°, the coverage area 300 of the platform 202 would be 36,350 km². Alternatively, assuming a maximum range 302 of 75 km for a minimum elevation angle γ of 15 degrees, the coverage area 300 of the platform 202 would be 16,675 km². Note the distinction between range 302 in FIG. 3 and coverage area radius 301 in FIG. 3. The range 302 is the RF line-of-sight propagation path between the platform 202 and the user terminal 208 and the coverage area radius 301 is a measure along the arc of the surface 204 from the sub-HAP point to the edge of coverage.

FIG. 3 also shows a spherical surface 304 which extends the u-v surface used in the design of GEO satellites. In a GEO system the u-v surface is nearly planar since the Earth subtends an angle of only 20 degrees with respect to this surface. For HAPs and LEO satellites, this surface cannot be approximated by a plane and must be considered spherical.

Figure 4:
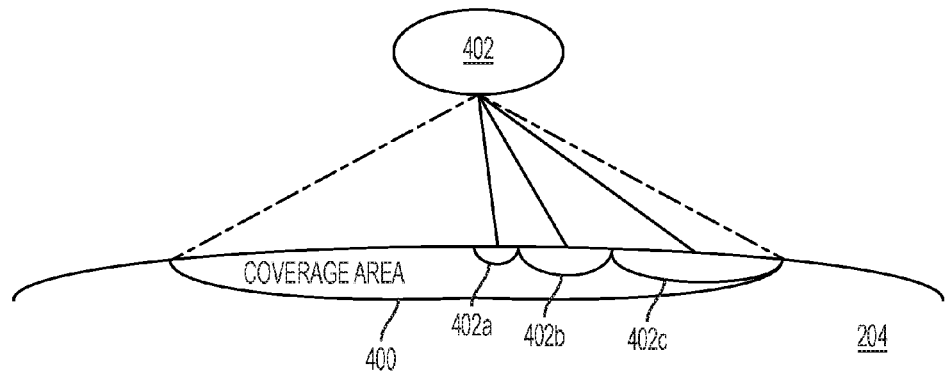
FIG. 4 shows a diagram of a coverage area of a prior art HAP that includes antennas of the same size.

FIG. 4 shows a diagram of a coverage area 400 of a HAP 402 that includes antennas of the same size (or have the same aperture) similar to the prior art system described in connection with FIG. 1. The position of the antenna apertures in the HAP spherical u-v surface and the projection of the radiated beams are shown respectively in the charts 102 and 104 of FIG.

An example of the u-v surface 304 is shown in FIG. 3. Similar to FIG. 3, the HAP 402 of FIG. 4 operates at an altitude of 20 km and has a range of 75 km. In this example the coverage area 400 is partitioned into 19 cells 404 including a central cell sounded by six cells, which themselves being surrounded by 12 cells. The HAP 402 includes 19 antennas of the same size to provide coverage respectively to the 19 cells. The 19 antenna patterns projected onto the u-v surface are hexagonal, as shown in the chart 102 of FIG. 1. These hexagons are each illuminated by an antenna which is pointed normal to the u-v surface. An equal-gain contour, for example the 3 dB contour, falls on the six vertices of the hexagon. The neighboring antenna illuminates an adjacent hexagon so that its 3 dB gain contour falls on the shared vertices. Along the line connecting the vertices both antenna radiation patterns have the same gain and this defines the boundary between the two cells.

Figure 5:
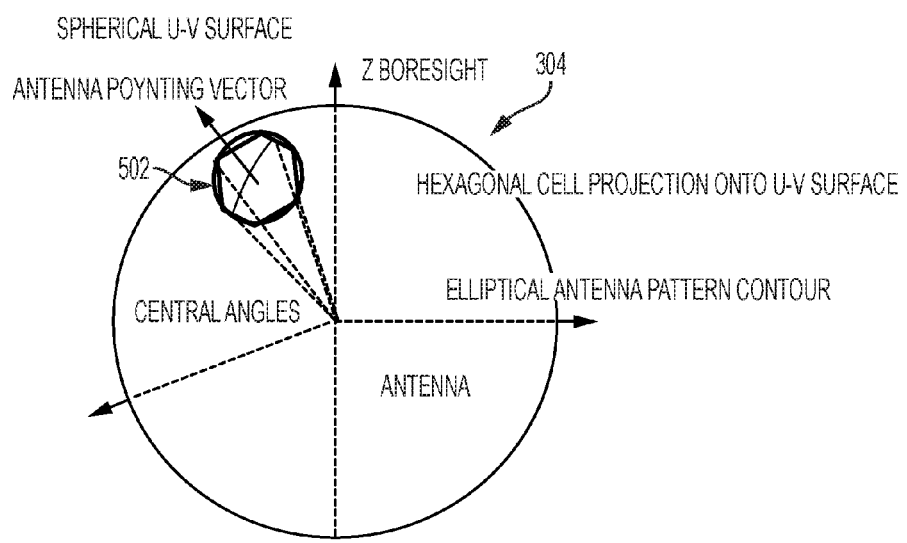
FIG. 5 shows a diagram of a spherical hexagonal pattern incident on a u-v surface.

A spherical hexagonal pattern incident on the u-v surface 304 is shown in the diagram of FIG. 5. In this figure, a cell 402 projects back onto a spherical hexagon 502. In this example, the antennas are configured to have a beamwidth or central angle measured in the plane containing the antenna system boresight and the antenna Poynting vector of 29.7° and are assumed to have an efficiency η of 55% such that the gain of the center antenna and the antennas in the outer rank would be about 15.5 dBi. Note that the size of the spherical hexagons shown in FIGS. 1 and 6 is determined by the desired coverage area and may not tessellate the spherical u-v surface. In this case the hexagons of FIGS. 1 and 5 would not be regular and would need to be illuminated by antenna apertures with elliptical beam contours.

When these beams are projected onto the surface 204 the center beam illuminates a circular area and the inner and outer ring of beams project fan shaped coverage areas on the surface. The innermost cell 404a has a diameter of 12.2 km. In comparison, the 6 next innermost cells including the cell 404b are fan shaped and have an arc length in the radial dimension of 14.4 km, an arc length in the orthogonal dimension at an inner edge of 6.4 km, and an arc length in the orthogonal dimension at an outer edge of 21 km. Additionally, the 12 outermost cells including the cell 404c are fan shaped and have an arc length in the radial dimension from the coverage area center of 53 km and an arc length in the orthogonal dimension that varies from about 10.5 km at an inner edge to about 38 km at an outer edge. The use of the same antenna size for the different cells for the relatively low altitude HAP 402 results in significantly different sized cells as shown in FIGS. 1 and 4. Additionally, the difference in path loss between the edge of the coverage area 400 at the cell 404c and the center of the cell 404a is about 11.6 dB. Further, the outer cells would also experience more rain fading and atmospheric gas absorption as a result of the lower elevation angle and path length or range. This relatively high path loss difference between cells means that users at the edge of the coverage area 400 would experience a lower link margin and reduced bandwidth density, resulting in poorer QoS.

FIG. 6 shows a table 600 of properties of the coverage area 400 for the prior art example discussed above in conjunction with FIG. 4. The table 600 shows that the 12 outermost cells 402c each cover an area of 1283 km² while the innermost cell 404a only covers an area of 118 km². Further, the cells 404c are further from the HAP 402 than cells 404a and 404b, which reduces the link margin. This increased path loss can be overcome by increasing the code rate but this further reduces the user data rates available. This means that the outermost cells 404c have lower available bandwidth per unit area by orders of magnitude compared to the innermost cell 404a.

Figure 7:
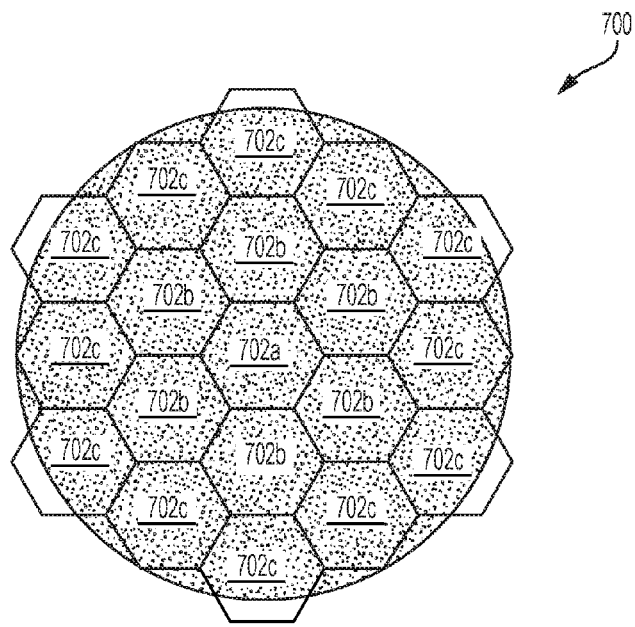
FIG. 7 shows a diagram of an example coverage area that includes 19 similar sized cells, according to an example embodiment of the present disclosure.

To overcome the issues of having differently sized cells, especially at the outermost cells, the antennas 206 of the example platform 202 of FIG. 2 are configured such that the cells have a substantially uniform area and/or surface spectral density. FIG. 7 shows a diagram of an example coverage area 700 that includes 19 similar sized cells. The coverage area 700 includes an innermost cell 702a surrounded by six next innermost cells 702b, which are surrounded by 12 outermost cells 702c. The antennas 206 of the platform 202 are sized differently to compensate for the different subtended angles. In some instances, the antennas corresponding to each ring of cells 702a, 702b, and 702c may be configured to have the same dimensions since the cells within the same ring generally are the same distance from the platform 202. FIG. 7 also shows the cells as having a hexagonal-shape such that the entire coverage area 700 has a honeycomb shape. The spot beams which illuminate these cells generally have elliptical equal-gain cross sections so that the spot beams overlap.

Figure 8:
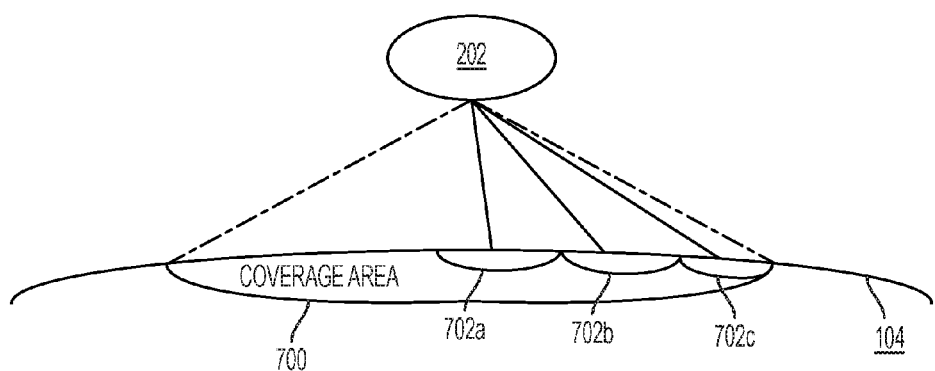
FIG. 8 shows the example coverage area of FIG. 7 with uniform cells, according to an example embodiment of the present disclosure.

FIG. 8 shows the example coverage area 700 with the uniform cells 702a, 702b, and 702c. FIG. 9 shows the uniform cells 702 as they project back onto the spherical u-v surface 304 around the platform 202 (chart 902) and as they appear on the surface 204 (chart 904). Similar to the prior art example discussed above in conjunction with FIGS. 1 and 4, the example platform 202 operates at 20 km above the surface 204 and has a range of 75 km for a user terminal elevation angle γ of 15°. However, since the antennas 206 are differently sized and/or have different sized apertures, the beamwidth of the antennas corresponding to different rings of cells 702a, 702b, and 702c are also different. For instance, as shown in table 1000 of FIG. 10, the beamwidth of the antenna associated with the cell 702a is 79.7°, the beamwidth of the antennas corresponding to the cells 702b is 25.6° by 52°, and the beamwidth of the antennas corresponding to cells 702c is 8.9° by 28°. The central angle or beamwidth orthogonal to the radial angular dimension in the spherical u-v surface 304 for the inner and outer rings are determined by use of the cosine law from spherical trigonometry. This configuration yields cells 702 that all have an effective diameter of 33.4 km and an area of about 878 km². Such a configuration accordingly provides cells 702 with a substantially similar surface spectral density and bandwidth, thereby providing a communications system that has a consistent QoS across the coverage area. The higher gain of the antennas covering the outer ring also helps to compensate for the additional path loss. In comparison, the system discussed in conjunction with FIG. 1 has common beamwidths among the antennas but different sized cells.

Figures 10, 11:
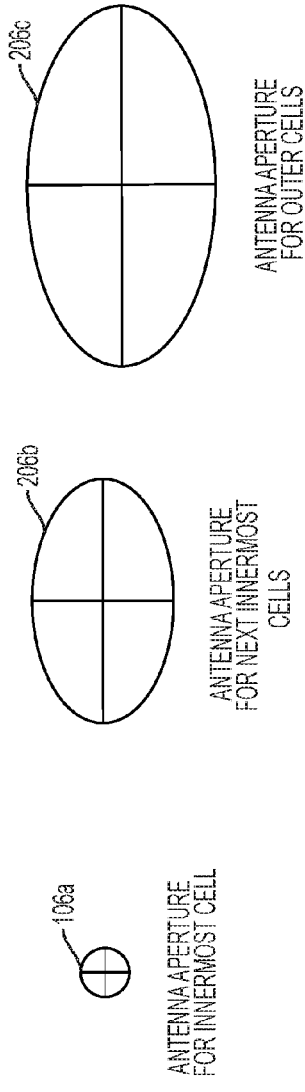
FIG. 10 shows a table of properties of the cells and corresponding antennas discussed above in conjunction with FIGS. 7 and 8, according to an example embodiment of the present disclosure.
FIG. 11 shows a diagram of differently sized antennas of the HAP of FIG. 2 used to produce the similarly sized cells of FIGS. 7 and 8, according to an example embodiment of the present disclosure.

FIG. 11 shows a diagram of differently sized antennas 206 of the platform 202 used to produce the similarly sized cells 702 of FIGS. 7 and 8. The example antenna 206a corresponding to the cell 702a is configured to have an aperture diameter of 0.35 inches and a gain of 7 dB to produce a beamwidth of 79.7°. In this example, the beamwidth of the antenna is selected based on the angle α of the cell 702b being less than 39.9°. The antenna 206b may be implemented by an open ended flared waveguide.

The example antenna 206b corresponding to the cell 702b is configured to have an elliptical aperture with dimensions of 1.07 by 0.47 inches and a gain of 13.4 dB to produce an elliptical beam of 25.6° by 52°. In this example, the radial beamwidth of the antenna 206b is selected based on the angle α of the cell 702b being between 39.9° and 65.5°. The antenna 206b may be implemented by a small feed horn.

The example antenna 206c corresponding to the cells 702c is configured to have an antenna aperture configured to produce the spot beam with a beamwidth of 8.9° by 28°. Such an antenna 206c would have a gain of 21 dB. Assuming 55% aperture efficiency, the antenna 206c is configured to have an elliptical aperture of 3.11 by 1.0 inches at 30 GHz (as shown in FIG. 11). A small reflector may be used to provide an antenna with these dimensions.

It should be appreciated that all of these antennas 206 shown in FIG. 11 may be implemented using phased arrays or other antenna technology.

Example Design Considerations

The design goal is to have a uniform user perceived QoS. The reasonable assumption that the user terminals 208 are uniformly distributed within a coverage area requires a uniform distribution of capacity in terms of available user data rates. It is further desirable that all of the user terminal antennas and transceivers are similar in design independent of their location within the coverage area. Since both HAPs and LEO satellites move, even stationary user terminals 208 will transition from one cell to the next cell and users will expect the same QoS without disruption. This motivates the allocation of the same amount of spectrum within each cell in conjunction with uniform cell sizes.

FIG. 12 shows a diagram of parametric inputs to the design process implemented by the system configuration manager 212 of FIG. 2. These inputs may change in time with improved technology and with new frequency spectrum allocations. Some of these design parameters are location dependent such as rain fall statistics and therefore rain fades. Some of these parameters are the choice of a service provider such as availability and minimum elevation angle or terminal costs. In any event, design process of the system configuration manager 212 remains the same.

Current estimates are that HAPs located 20 km above the surface 204 may move within a circle having a 0.25 km radius. At the sub-HAP point on the surface this corresponds to an angle of 0.7 degrees. If a non-tracking antenna is desired for the user terminal 208 then this constrains the antenna to a 3 dB beamwidth of 1.4 degrees and therefore constrains the gain of the user terminal antenna as well. However, new antenna designs with modest tracking capability are becoming available in the same time frame as HAP technology. This design example assumes an antenna with a 1 degree 3 dB beam width and the ability to track +/−0.5 degrees. This may be achieved with a reflector antenna illuminated by a small feed array of 16 elements, for example. This results in a standard user terminal gain of 45 dBi. It is further assumed that the user terminal receiver has a noise figure of 5 dB corresponding to a noise temperature of 627 degrees K.

Figure 13:
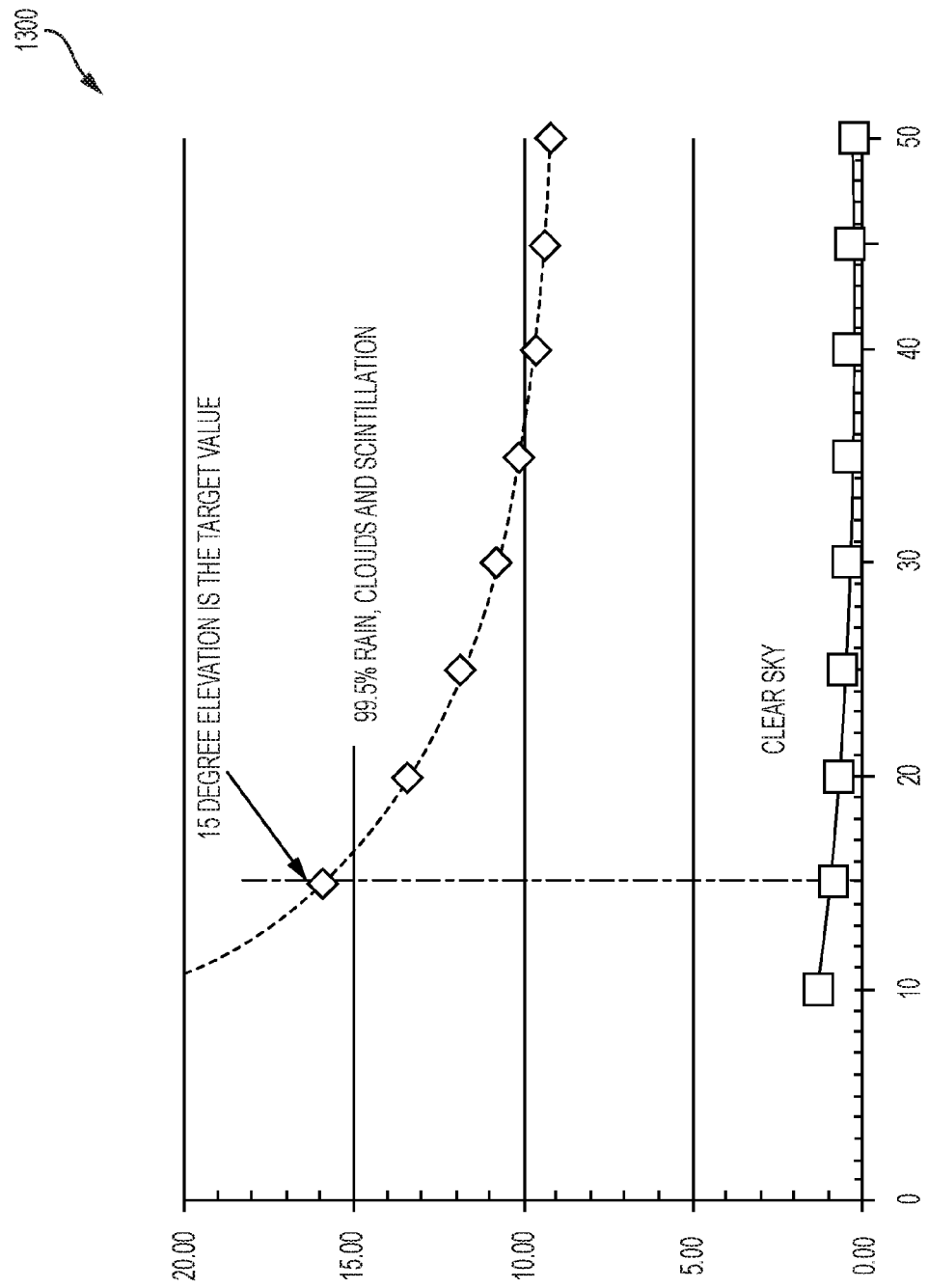
FIG. 13 shows a diagram of a graph of representative atmospheric gas attenuation and rain attenuation for 28 GHz using an ITU reference atmospheric model, according to an example embodiment of the present disclosure.

Atmospheric attenuation due to rain, clouds and gas absorption is dependent on location. For the purposes of this example the standard atmosphere described in International Telecommunication Union ("ITU") Recommendations P.676, P.618, P.840, and P.838 is assumed. For each HAP configuration, local atmospheric data, if available, is used. This additional loss is shown graph 1300 of FIG. 13 as a function of elevation angle for the example embodiment. For example, the graph 1300 of FIG. 13 shows there is a total attenuation of 99.5% (fade of 15 dB) for signals with a 28 GHz frequency due to rain, clouds, gas absorption, and scintillation.

In order to estimate the user data rate available at any possible user terminal location within the coverage area, link budgets are computed assuming the same modulation and coding waveforms as used in the DVB-S2 standard. This data is given by the table 1400 shown in FIG. 14 where the modulation and coding schemes are ranked by Eb/No. The DVB-S2 waveform is use for the example embodiment but the described process is not limited to this particular waveform.

The results of the system configuration process include HAPs design parameters such as antenna apertures and required transmit power levels per cell. If the links do not close at the edge of coverage or if excessive transmit power is required then the input parameters must be re-evaluated. Design modifications include increasing the performance requirements on the user terminal 208 (i.e., more antenna gain), using a lower frequency with better rain attenuation performance, reducing the size of the coverage area (i.e., increasing the minimum user terminal elevation angle), and/or using an alternative coverage area embodiment by partitioning the coverage area into more cells.

Figure 16:
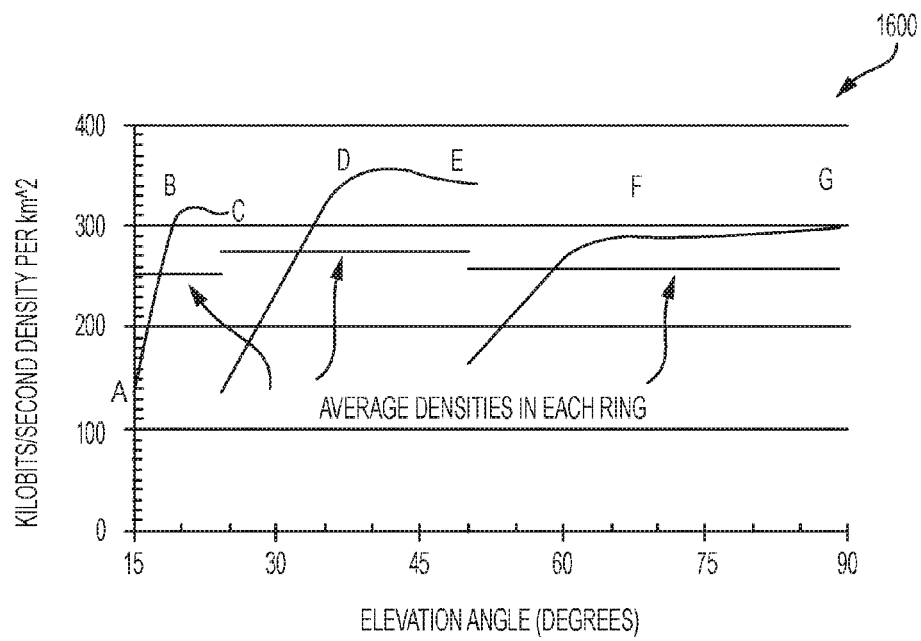
FIG. 16 shows a diagram of surface spectral density as a function of elevation angle throughout a coverage area specified by the example described in conjunction with FIGS. 12 to 15, according to an example embodiment of the present disclosure.
Figure 17:
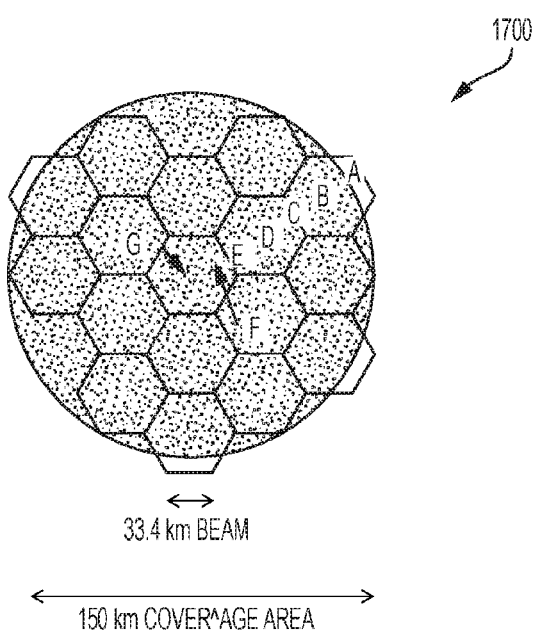
FIG. 17 shows a diagram of the coverage area including the location of the labeled points in the diagram of FIG. 16, according to an example embodiment of the present disclosure.

In the example shown by table 1500 of FIG. 15 and graph 1600 of FIG. 16, the output design has a uniform user data rate density of about 250 kb/sec/km$^2$, which is about an order of magnitude higher than that achieved by many of the current operating satellite systems. In addition the total HAPs transmit power measured at the HAPs antenna flange is only 6.6 Watts, which is well within the expected available power for commercial HAPS. The locations within the coverage area of the points on the curve of FIG. 16 are shown in coverage area 1700 of FIG. 17. In this case, these results are so good that the system configuration may be reevaluated with more relaxed user terminal performance requirements or the designer may consider extending the range of coverage or increasing the link availability above 99.5%. Another design possibility includes reducing the total number of cells within the coverage area from 19 to 7 (i.e., one center cell 702a and one outer ring of six cells 702b). However this reduces the total user data throughput of the system.

HAP Coverage Area Second Embodiment

In some instances, the system configuration manager 212 of FIG. 2 may choose not to use a beamwidth of 80° for the center cell 702a because the gain for the antenna 206a is only 7 dB compared to gains of 13.4 dB and 21 dB respectively for the antennas illuminating cells 702b and 702c. Such an antenna is likely to have high side lobe radiation potentially interfering with the reuse of its frequency allocation in other beams. Also the difference in path loss at the outer cells 702c is only 11.6 dB. This means that the inner cell 702a may have the worst case link margins compared to the outer cells 702c in clear weather, excluding the attenuation due to atmospheric gas absorption. However, side lobes of the antenna 206a may be high enough to interfere with the reception of the other antennas 206b and 206c, thereby limiting frequency reuse.

Figures 18, 19:
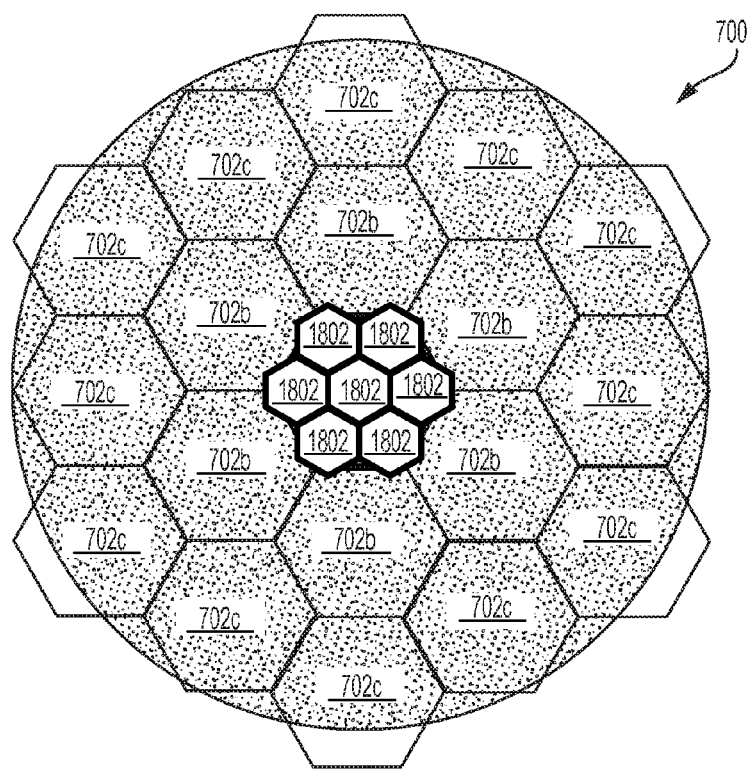
FIG. 18 shows a diagram of an example coverage area that includes different sized cells with the same spatial spectral density, according to an example embodiment of the present disclosure.
FIG. 19 shows a table of properties of the cells and corresponding antennas discussed above in conjunction with FIG. 18, according to an example embodiment of the present disclosure.

To resolve this issue, the center cell 702a may further be divided into seven sub-cells 1802, as shown in FIG. 18. To maintain the same surface spectral density among the cells 702b, 702c, and 1802, the spectrum or bandwidth available to each of the sub-cells is divided by seven from the total spectrum allocated to the center cell 702a. This configuration reduces the noise bandwidth and improves the link margins since the antenna gain would be 14.1 dB for the centermost cell 1802 and 16.3 dB for the surrounding cells 1802, which is similar to the gains of 13.4 dB and 21 dB for the antennas illuminating cells 702b and 702c.

FIG. 19 shows a table 1900 comparing the area and bandwidth of the cells 702b and 702c and the cells 1802. While the coverage area of each of the cells 1802 is smaller at 125 km$^2$, the surface spectral density is the same as the cells 702b and 702c because the spectrum for each of the cells 1802 is reduced to 21 MHz or 150/7 MHz. This configuration enables smaller beamwidths to be used for the center of the coverage area 702 rather than 80°, which provides consistent QoS between the outer cells 702c and the innermost cells 1802.

HAP Coverage Area Third Embodiment

Figures 20, 21:
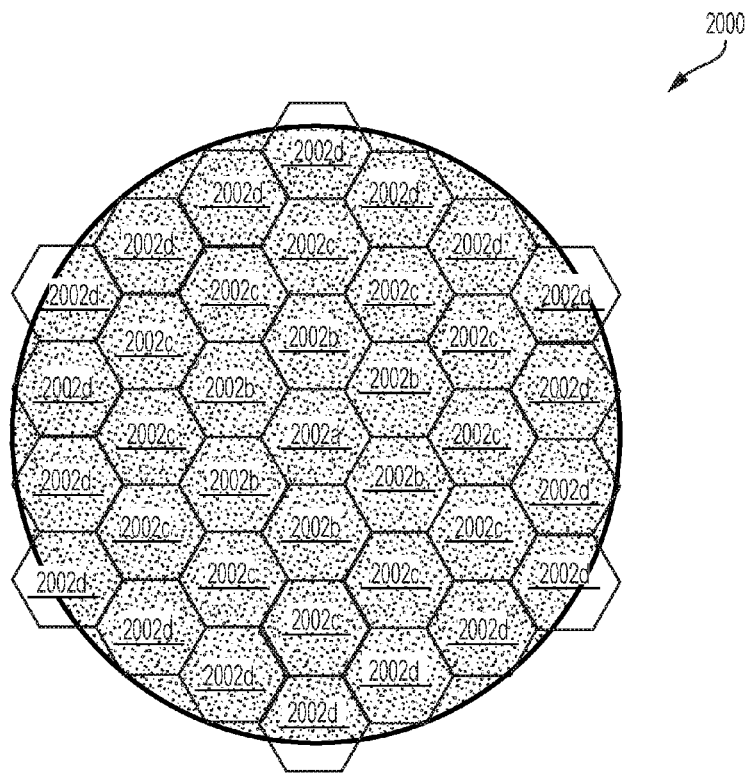
FIG. 20 shows a diagram of an example coverage area that includes 37 similar sized cells, according to an example embodiment of the present disclosure.
FIG. 21 shows a table of properties of the cells and corresponding antennas discussed above in conjunction with FIG. 20, according to an example embodiment of the present disclosure.

FIG. 20 shows a diagram of a coverage area 2000 of the example platform 202 of FIG. 2 that includes 37 equal-sized cells 2002. In this example, the cells 2002 are partitioned into four different rings with a first ring including cell 2002a, a second ring including six cells 2002b, a third ring including 12 cells 2002c, and a fourth ring including 18 cells 2002d. The antennas 206 corresponding to the cells 2002 of the same rings have similar dimensions while the dimensions between the antennas of the different rings differ. This configuration of antennas produces a surface spectral density that is roughly uniform throughout the coverage area 2002.

As shown in table 2100 of FIG. 21, an antenna corresponding to the cell 200a is configured to have an aperture diameter (and beamwidth) corresponding to an elevation angle of 59 degrees at the edge of cell coverage and an effective cell radius of 12 km. The six antennas corresponding to six cells 2002b are configured to have an aperture diameter (and beamwidth) corresponding to an elevation angle of 32.1 degrees at the edge of cell coverage and an effective cell radius of 12 km. The 12 antennas corresponding to 12 cells 2002c are configured to have an aperture diameter (and beamwidth) corresponding to an elevation angle of 20.7 degrees at the edge of cell coverage and an effective cell radius of 12 km. Additionally, the 19 antennas corresponding to 19 cells 2002d are configured to have an aperture diameter (and beamwidth) corresponding to an elevation angle of 15 degrees at the edge of cell coverage and an effective cell radius of 12 km. Such a configuration of antennas having different sizes produces cells 2002 with diameters of approximately 24 km. Further, since the cells 2002 are smaller than the cells 702, the beamwidth for the center cell 2002a is reduced from 79.7° to 69.8° and the gain increased from 7 to 9.2 dB.

HAP Coverage Area Fourth Embodiment

Figure 22:
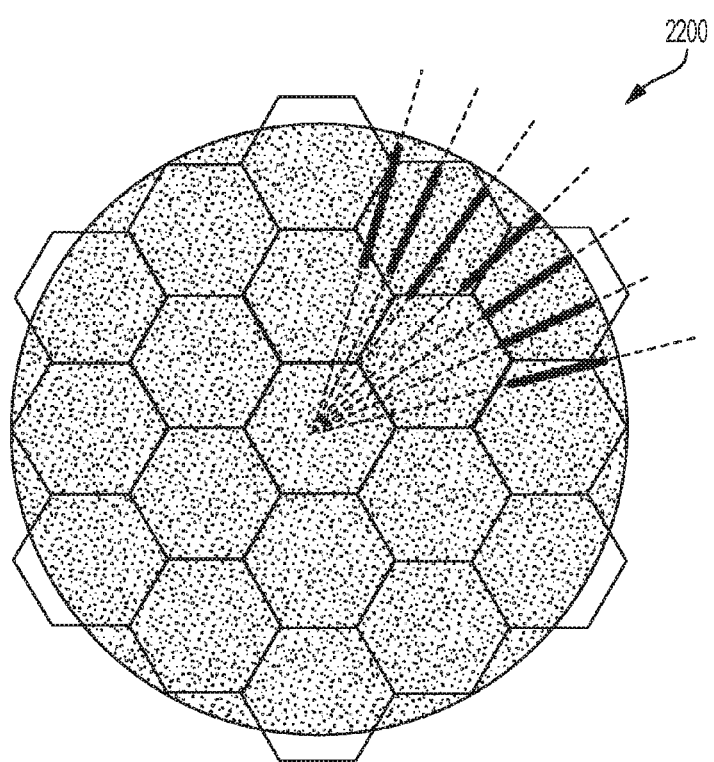
FIG. 22 shows a diagram of an example coverage area that includes sectored outer cells, according to an example embodiment of the present disclosure.

In a fourth embodiment, a coverage area 2200 includes an outer ring of 12 cells, an inner ring of 6 cells, and a center cell. In this embodiment, the inner ring of 6 cells from the first embodiment described in conjunction with FIGS. 7 to 11 may be divided or sectored each into multiple cells, as shown in FIG. 22. In the example shown, each cell in the outer ring is sectored into 3 separate cells. The beam necessary to illuminate each sector would be nearly circular with a beamwidth of 8.8° by 9.3°. The dimensions of the antenna aperture would be elliptical at 3.11 by 2.95 inches and would have a gain of 25.8 dB. This represents an improvement of about 5 dB over the design with non-sectored cells and all three beams can be produced by a single fixed phased array.

Flowchart of the Example Process

Figure 23:
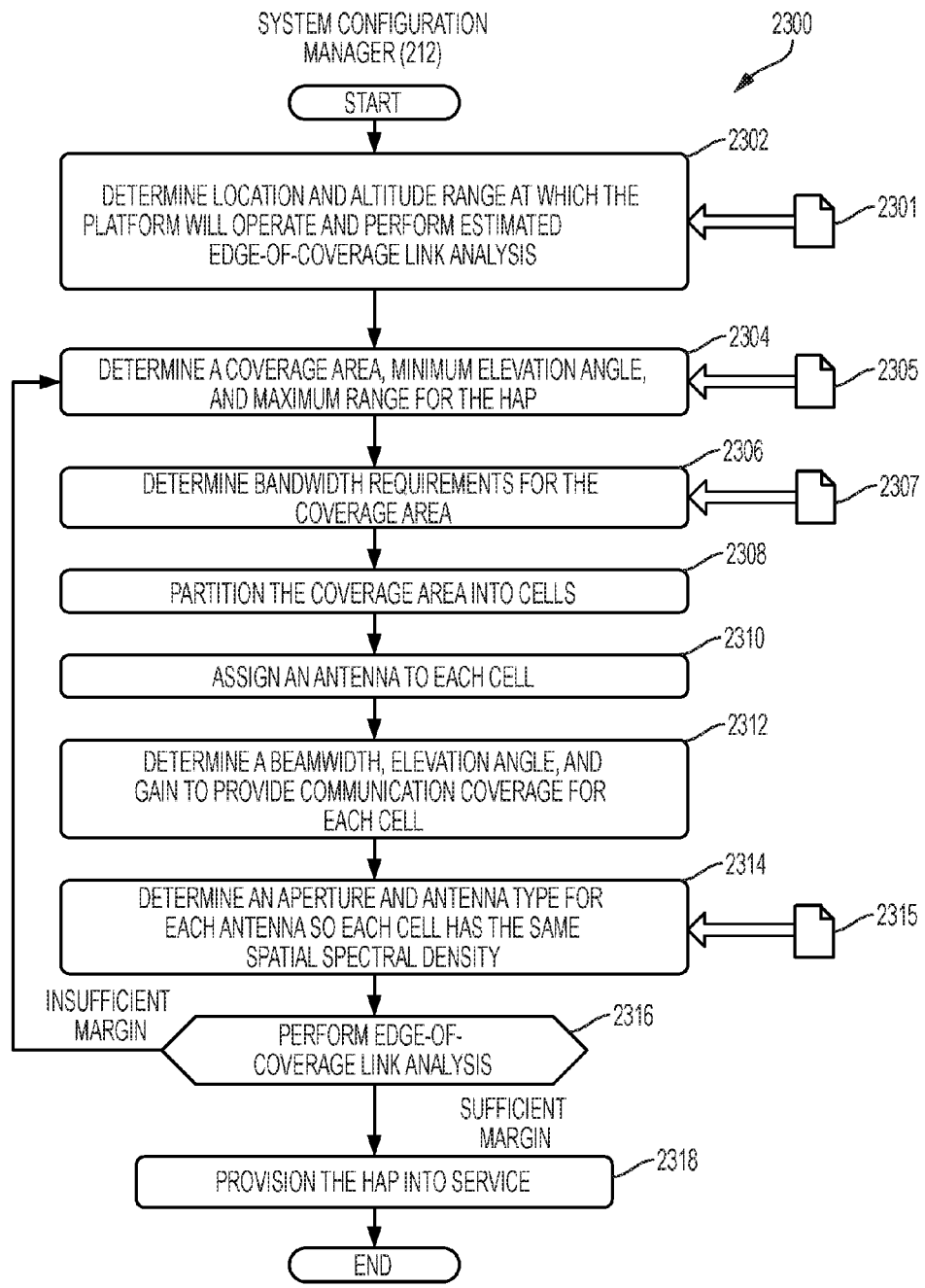
FIG. 23 illustrates a flow diagram showing an example procedure to configure antennas on a HAP to produce cells with a substantially uniform spatial spectral density, according to an example embodiment of the present disclosure.

FIG. 23 illustrates a flow diagram showing an example procedure 2300 to configure antennas on a platform 202 to produce cells with a substantially uniform surface spectral density, according to an example embodiment of the present disclosure. Although the procedure 2300 is described with reference to the flow diagram illustrated in FIG. 23, it should be appreciated that many other methods of performing the steps associated with the procedure 2300 may be used. For example, the order of many of the blocks may be changed, certain blocks may be combined with other blocks, and many of the blocks described are optional. Further, the actions described in procedure 2300 may be performed among multiple devices.

The example procedure 2300 of FIG. 23 operates on, for example, the system configuration manager 212 of FIG. 2. The procedure 2300 begins when the system configuration manager 212 receives a request 2301 to provision a HAP (e.g., the platform 202 of FIG. 2) for a specified coverage area. The request 2301 may include, for example a latitude (e.g., geographic location) at which the proposed HAP will operate. The request 2301 may also include a season of the year in which the HAP will operate. Responsive to the request 2301, the system configuration manager 212 determines an altitude at which the HAP will operate (block 2302). The altitude depends on the altitude of the tropopause, where the atmospheric winds are minimal. This altitude in turn depends on the latitude of the coverage area. A preliminary edge-of-coverage link analysis may be performed at this time.

The system configuration manager 212 also determines a minimum elevation angle (e.g., $\gamma=15°$) from the ground to the HAP and a maximum communication range for the HAP (block 2304). The system configuration manager 212 may use parametric inputs 2305 (e.g., terminal design constraints, HAP constraints, available spectrum, rain/atmospheric absorption fade statistics, etc.) described in conjunction with FIGS. 12 to 17 to determine the minimum elevation angle and the maximum communication range. Using the altitude, the minimum elevation angle, and the maximum range, the system configuration manager 212 determines a coverage area for the specified area (block 2304). It should be noted that the costs of installation can increase with lower elevation angles since it becomes more difficult to site an antenna with visibility to the HAP when surrounded by buildings and trees.

The example system configuration manager 212 further determines bandwidth requirements and/or QoS requirements/parameters for the coverage area (block 2306). The bandwidth requirements may be based on inputs 2307 including, for example, a number of users or subscribers. The configuration manager 212 then partitions the coverage area into cells (block 2308). In some instances, the cells may be equal-sized hexagonal cells. After partitioning the coverage area, the example system configuration manager 212 is configured to assign an antenna to each of the cells (block 2310).

The system configuration manager 212 next determines a beamwidth, elevation angle, and/or gain for each antenna to provide communication coverage to the respective cell according to the bandwidth requirements and/or QoS requirements (block 2312). The system configuration manager 212 then determines an aperture size and/or an antenna type for each of the antennas based, for example, on the determined beamwidth, gain, elevation angle, etc. such that each cell has the same size and/or surface spectral density (block 2314). The aperture size and/or an antenna type for each of the antennas may also be based on link performance requirements 2315 and/or the availability of antenna designs. The system configuration manager 212 then performs a link analysis to determine if there is adequate link margin for the required level of service (block 2316). If there is sufficient margin, the HAP is provisioned (block 2318) and the procedure 2300 ends until another HAP is requested to be provisioned into service. The example procedure 1500 may also begin again if the HAP is returned from operation for an upgrade and/or modification. However, it should be noted that if a phased array is used instead of individual antennas, the system designer may configure the beam forming coefficients of the phased array to form new spot beams while the HAP is flying.

Returning to block 2316, if there is insufficient margin, the example procedure 2300 returns to block 2304. At this point the system configuration manager 212 determines a modified coverage area, minimum elevation angle, and maximum range that provides sufficient margin. For example, a smaller coverage area may be necessary or the number of cells may need to be increased from 19 to 37.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It should also be understood that a telecommunications platform providing substantially uniform surface spectral density using the methods described herein may be an element of a larger system. Examples of larger system include relays between platforms, relays between platforms and GEO satellites, relays between platforms to gateways shared by those platforms, relays between gateways and GEO satellites.

The invention is claimed as follows:

1. A telecommunications platform apparatus comprising:
a plurality of antennas configured to provide communication coverage among a plurality of terminals within a specified area on the ground, each antenna being configured to communicate with a specified cell within the specified area,
wherein the antennas have differently sized apertures to maintain a similar surface spectral density among the cells within the specified area.

2. The apparatus of claim 1, wherein the plurality of terminals includes user terminals and a gateway, and wherein communications are between the gateway and the user terminals.

3. The apparatus of claim 2, wherein each of the antennas that communicates with the gateway is at least one of mechanically and electrically controlled to continually point at the gateway.

4. The apparatus of claim 1, wherein the plurality of terminals associated with the telecommunications platform communicates with a plurality of terminals associated with a second telecommunications platform via a communications link between the telecommunications platforms.

5. The apparatus of claim 1, wherein the apertures of the antennas corresponding to cells at outer edges of the specified area have a larger area than apertures of antennas corresponding to cells within a center of the specified area.

6. The apparatus of claim 1, wherein the telecommunications platform apparatus includes a low earth orbit satellite.

7. The apparatus of claim 1, wherein the telecommunications platform apparatus includes a high altitude platform.

8. The apparatus of claim 7, wherein the high altitude platform operates between 17 km and 22 km above a center of the specified area of the ground.

9. The apparatus of claim 1, wherein the plurality of antennas is configured to provide substantially uniform spectral density coverage to each of the plurality of terminals.

10. The apparatus of claim 1, wherein the telecommunications platform apparatus is communicatively coupled to a GEO satellite.

11. The apparatus of claim 1, wherein the telecommunications platform apparatus causes the cells on the surface to remain substantially stationary.

12. The apparatus of claim 1, wherein the telecommunications platform apparatus causes the cells on the surface to move within the specified area.

13. The apparatus of claim 1, wherein each of the cells has an approximately hexagonal-shape and the antennas are arranged such that the corresponding cells form a honeycomb shape within the specified area.

14. The apparatus of claim 13, wherein the apertures of the antennas are configured such that each of the hexagonal-shaped cells has a similar area.

15. The apparatus of claim 1, wherein the plurality of antennas includes 19 antennas and the specified area is partitioned into 19 cells such that:
the 19 cells have an area of 878 $km^2$ and a radius of 16.7 km;
an antenna corresponding to a cell within a center of the specified area is configured to have a beamwidth of 79.7° and an aperture diameter of 0.35 inches conditioned on the apparatus operating between 28 to 30 GHz;
six antennas corresponding to six cells around the center cell of the specified area are configured to have an elliptical 3 dB beam contour of 25.6° by 52°, an aperture with dimensions of 1.07 by 0.47 inches, and a gain of 13.4 dB conditioned on the apparatus operating between 28 to 30 GHz; and
12 antennas corresponding to 12 cells around the six cells of the specified area are configured to have an elliptical 3 dB beam contour of 8.9° by 28°, an aperture with dimensions of 3.11 by 1.0 inches, and a gain of 21 dB conditioned on the apparatus operating between 28 to 30 GHz.

16. The apparatus of claim 15, wherein the antennas each have a downlink spectrum of 150 MHz.

17. The apparatus of claim 15, wherein the center antenna includes an open ended waveguide antenna, the six antennas include small horn antennas, and the 12 antennas include small reflector antennas.

18. The apparatus of claim 15, wherein the antennas are at least one of fixed or variable phased array antennas.

19. The apparatus of claim 1, wherein the plurality of antennas includes 25 antennas and the specified area is partitioned into 25 cells such that:
an inner seven cells have an area of 125 $km^2$ and a radius of 6.3 km;
an antenna corresponding to a central cell of the inner seven cells within a central area of the specified area is configured to have a beamwidth of 35.1°, an aperture diameter of 0.78 inches, and a gain of 14.1 dB conditioned on the apparatus operating between 28 to 30 GHz;
six antennas corresponding to six cells of the inner seven cells positioned around the center cell of the specified area are configured to have an elliptical 3 dB beam contour of 22.3° by 33°, an aperture with dimensions of 1.23 by 0.83 inches, and a gain of 16.3 dB conditioned on the apparatus operating between 28 to 30 GHz;
six antennas corresponding to outer six cells around the seven inner cells of the specified area are configured to have an elliptical 3 dB beam contour of 25.6° by 52°, an aperture with dimensions of 1.07 by 0.47 inches, and a gain of 13.4 dB conditioned on the apparatus operating between 28 to 30 GHz; and
12 antennas corresponding to 12 cells around the outer six cells of the specified area are configured to have an elliptical 3 dB beam contour of 8.9° by 28°, an aperture with dimensions of 3.11 by 1.0 inches, and a gain of 21 dB conditioned on the apparatus operating between 28 to 30 GHz.

20. The apparatus of claim 19, wherein the seven antennas corresponding to the seven inner cells are configured to cover the cells each with an area of about 125 $km^2$, the six antennas are configured to cover the six outer cells each with an area of about 878 $km^2$, and the 12 antennas are configured to cover cells each with an area of about 878 $km^2$.

21. The apparatus of claim 19, wherein the seven antennas, corresponding to the seven inner cells, each have a spectrum of 21.4 MHz, the six antennas, corresponding to the six outer cells, each have a spectrum of 150 MHz, and the 12 antennas each have a spectrum of 150 MHz.

22. The apparatus of claim 1, wherein the plurality of antennas includes 37 antennas and the specified area is partitioned into 37 cells such that:
each cell has an area of 450 $km^2$ and a radius of 12 km;
one antenna corresponding to a central cell within the specified area is configured to have a beamwidth of 61.8°, an aperture diameter of 0.45 inches, and a gain of 9.2 dB conditioned on the apparatus operating between 28 to 30 GHz;
six antennas corresponding to six cells around the central cell of the coverage area are configured to have an elliptical 3 dB beam contour of 26.7° by 47°, an aperture with dimensions of 1.03 by 0.59 inches, and a gain of 14 dB conditioned on the apparatus operating between 28 to 30 GHz;
12 antennas corresponding to 12 cells around the six cells of the coverage area are configured to have an elliptical 3 dB beam contour of 8.9° by 28°, an aperture with dimensions of 2.46 by 1.02 inches, and a gain of 20.2 dB conditioned on the apparatus operating between 28 to 30 GHz; and
19 antennas corresponding to 19 cells around the 12 cells of the coverage are configured to have an elliptical 3 dB beam contour of 5.5° by 18°, an aperture with dimensions of 5.0 by 1.5 inches, and a gain of 25 dB conditioned on the apparatus operating between 28 to 30 GHz.

23. The apparatus of claim 1, further comprising a switch configured to:
receive communication data from at least one terminal;
determine a destination cell within the specified area for the communication data;
select one of the plurality of antennas corresponding to the destination cell to transmit the communication data; and
transmit the communication data via the selected antenna.

* * * * *